United States Patent
Schnellbacher et al.

(10) Patent No.: US 12,463,707 B2
(45) Date of Patent: Nov. 4, 2025

(54) MIMO FOR CPE

(71) Applicant: T-Mobile USA, Inc., Bellevue, WA (US)

(72) Inventors: George Jason Schnellbacher, Leawood, KS (US); Zheng Fang, McLean, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 335 days.

(21) Appl. No.: 18/331,002

(22) Filed: Jun. 7, 2023

(65) Prior Publication Data

US 2024/0413882 A1    Dec. 12, 2024

(51) Int. Cl.
*H04B 7/08* (2006.01)
*H04B 7/0413* (2017.01)
*H04B 7/06* (2006.01)

(52) U.S. Cl.
CPC ......... *H04B 7/0817* (2013.01); *H04B 7/0413* (2013.01); *H04B 7/0608* (2013.01)

(58) Field of Classification Search
CPC .. H04B 7/0817; H04B 7/0413; H04B 7/0608; H04B 7/061; H04B 7/0691; H04B 7/082; H04B 7/0874
See application file for complete search history.

(56) References Cited

U.S. PATENT DOCUMENTS

| | | | |
|---|---|---|---|
| 2011/0250926 A1* | 10/2011 | Wietfeldt | H01Q 1/243 455/525 |
| 2014/0349584 A1* | 11/2014 | Clevorn | H04B 7/0871 455/67.13 |
| 2015/0365877 A1 | 12/2015 | Leather | |
| 2017/0288765 A1* | 10/2017 | Khlat | H04B 7/0413 |
| 2023/0032544 A1 | 2/2023 | Proejts et al. | |

OTHER PUBLICATIONS

"Extended European Search Report Issued In European Patent Application No. 24177074.2-1206", Mailed Date: Nov. 8, 2024, 11 Pages.

Zheng, et al., "Massive MIMO Channel Models: A Survey," International Journal of Antennas and Propagation, vol. 2014, Article ID 848071, Published Jun. 16, 2014, 11 pages.

* cited by examiner

*Primary Examiner* — Tejis Daya
(74) *Attorney, Agent, or Firm* — Foley IP Law, PLLC

(57) ABSTRACT

An improved multiple-input multiple-output (MIMO) solution is disclosed for customer premises equipment (CPE) in which a set of wireless interfaces (e.g., cellular and WiFi), each with a plurality of antenna ports for MIMO operation, couple to an antenna switch fabric, which is then coupled to a set of antennas. In some examples, the antennas are distributed for maximum isolation and separation in order to improve MIMO channel separation, for example in an approximately spherical arrangement. The antenna switch fabric is instructed to select the optimal antennas based on signal parameter measurements, in order to improve overall performance. Selection of uplink (transmit) versus downlink (receive) antenna sets may be independent and based on different signal parameter measurements (e.g., for frequency division duplexing, FDD).

20 Claims, 5 Drawing Sheets

MIMO FOR CPE

BACKGROUND

Consumer premises equipment (CPE) may have both wired and wireless connectivity, with wireless connectivity including cellular and WiFi interfaces. The cellular interfaces may be the most recent generation of cellular, which is currently fifth generation (5G). It is common for CPE configurations to use multiple-input, multiple-output (MIMO) with four receive (Rx) downlink channels and two transmit (Tx) uplink channels. MIMO is generally used in order to increase bandwidth. This provides multi-user MIMO (MU-MIMO).

However, the effectiveness of MIMO in improving bandwidth is heavily dependent on channel separation, which in turn is dependent on both antenna isolation and radio frequency (RF) signal quality. CPE physical form factors that place a small set of antennas in close proximity with each other cannot take full advantage of the potential separation provided by channel conditions. Additionally, channel conditions may change rapidly, so that even if a good antenna set is provided, that antenna set may not be ideal for an appreciable length of time.

SUMMARY

The following summary is provided to illustrate examples disclosed herein but is not meant to limit all examples to any particular configuration or sequence of operations.

Disclosed solutions for improved multiple-input multiple-output (MIMO) for customer premises equipment (CPE) include: a plurality of MIMO wireless interfaces, each wireless interface comprising: a data port for receiving data for transmission over an air interface and outputting data received over the air interface, and a plurality of antenna ports; an antenna switch fabric coupled to each of the plurality of antenna ports of each of the plurality of wireless interfaces, and further coupled to a plurality of antennas; wherein each wireless interface is operative to: for each antenna port of the plurality of antenna ports of the wireless interface that is used for receiving, control the antenna switch fabric to select, based on at least a first signal parameter associated with at least one antenna, a receive antenna, and for each antenna port of the plurality of antenna ports of the wireless interface that is used for transmitting, control the antenna switch fabric to select, based on at least a second signal parameter associated with at least one antenna, a transmit antenna; and wherein the antenna switch fabric is operative to, based on at least the control by each wireless interface, route radio frequency (RF) signals between the antenna ports and the corresponding selected antennas of the plurality of antennas.

Additional disclosed solutions include: a CPE comprising: a signal routing portion; a plurality of MIMO wireless interfaces, each wireless interface comprising: a data port for receiving data for transmission over an air interface and outputting data received over the air interface, and a plurality of antenna ports; and an RF routing portion comprising: an antenna switch fabric, and a plurality of antennas; wherein the signal routing portion is operative to route data between the plurality of wireless interfaces and a data source and/or a data destination external to the CPE; wherein each wireless interface is operative to: for each antenna port of the plurality of antenna ports of the wireless interface that is used for receiving, control the antenna switch fabric to select, based on at least a first signal parameter associated with at least one antenna, a receive antenna, and for each antenna port of the plurality of antenna ports of the wireless interface that is used for transmitting, control the antenna switch fabric to select, based on at least a second signal parameter associated with at least one antenna, a transmit antenna, wherein the selection of the transmit antenna is independent of the selection of the receive antenna; and wherein the antenna switch fabric is coupled to each of the plurality of antenna ports of each of the plurality of wireless interfaces, and further coupled to a plurality of antennas and is operative to, based on at least the control by each wireless interface, route RF signals between the antenna ports and the corresponding selected antennas of the plurality of antennas.

Additional disclosed solutions include a method of wireless communication comprising: by each of a plurality of MIMO wireless interfaces: measuring, for each antenna port of a plurality of antenna ports of the wireless interface that is used for receiving, a first signal parameter associated with at least one antenna: based on at least the first signal parameter, controlling an antenna switch fabric coupled to the plurality of antenna ports to select a receive antenna from among a plurality of antennas: determining, by each of the plurality of wireless interfaces, for each antenna port of the plurality of antenna ports of the wireless interface that is used for transmitting, a second signal parameter associated with at least one antenna: based on at least the second signal parameter, controlling the antenna switch fabric to select a transmit antenna from among the plurality of antennas: and routing, by the antenna switch fabric, RF signals between the antenna ports and the corresponding selected antennas of the plurality of antennas.

BRIEF DESCRIPTION OF THE DRAWINGS

The disclosed examples are described below with reference to the accompanying drawing figures listed below, wherein.

Figure 1:
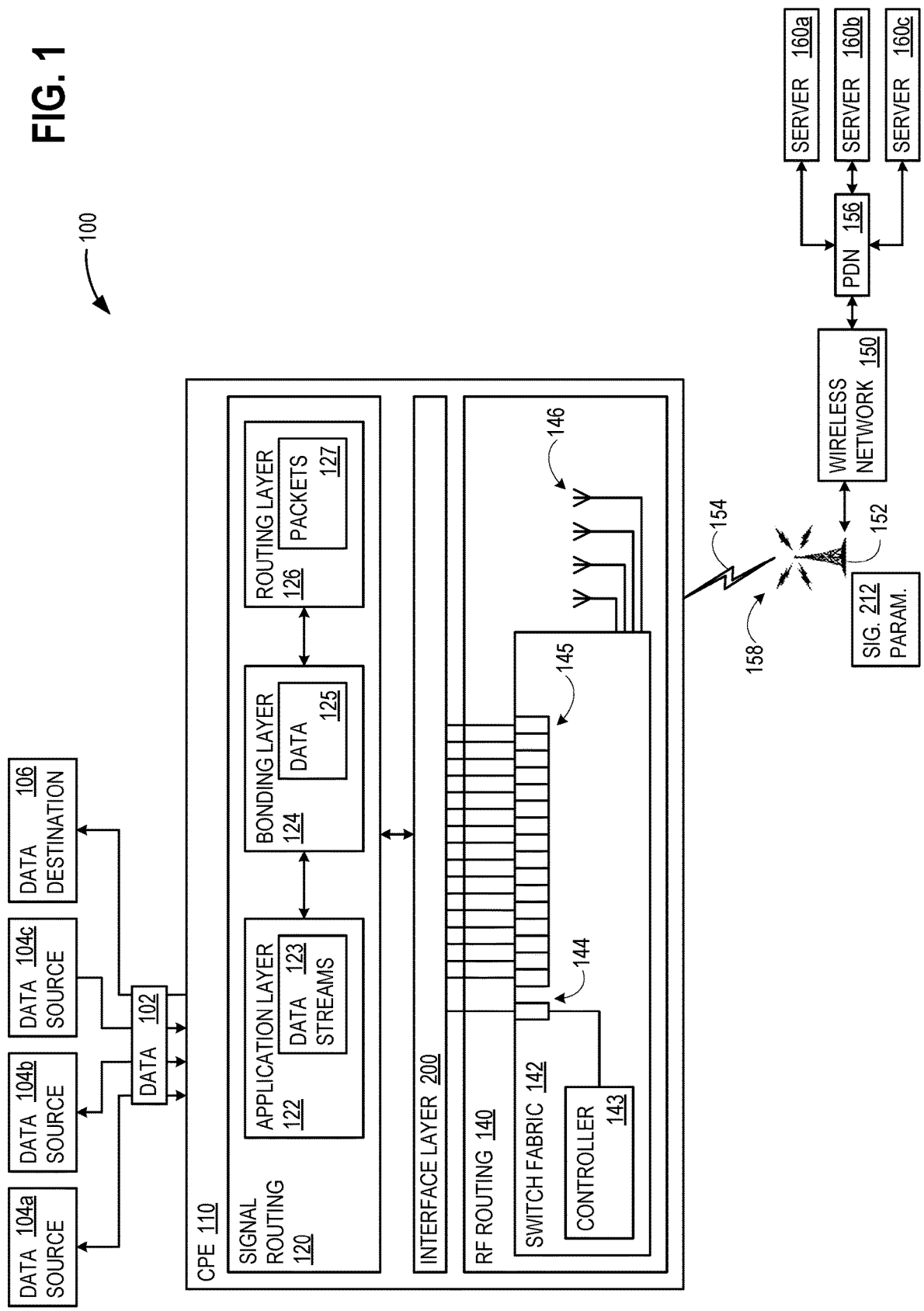
FIG. 1 illustrates an exemplary architecture that advantageously provides improved multiple-input multiple-output (MIMO) for customer premises equipment (CPE)

Corresponding reference characters indicate corresponding parts throughout the drawings. References made throughout this disclosure, relating to specific examples, are provided for illustrative purposes, and are not meant to limit all implementations or to be interpreted as excluding the existence of additional implementations that also incorporate the recited features.

DETAILED DESCRIPTION

An improved multiple-input multiple-output (MIMO) solution is disclosed for customer premises equipment (CPE) in which a set of wireless interfaces (e.g., cellular and WiFi), each with a plurality of antenna ports for MIMO operation, couple to an antenna switch fabric, which is then coupled to a set of antennas. In some examples, the antennas are distributed for maximum isolation and separation in order to improve MIMO channel separation, for example in an approximately spherical arrangement. The antenna switch fabric is instructed to select the optimal antennas based on signal parameter measurements, in order to improve overall performance. Selection of uplink (transmit) versus downlink (receive) antenna sets may be independent and based on different signal parameter measurements (e.g., for frequency division duplexing, FDD).

Aspects of the disclosure enhance the throughput of CPEs deployed in real-world environments, which either increases the amount of data carried through a fixed number of devices, or reduces the number of devices required to achieve a given level of data throughput. This is accomplished, at least in part, by controlling an antenna switch fabric to select a receive antenna, for each antenna port (of a plurality of antenna ports of a wireless interface) that is used for receiving, based on at least a first signal parameter associated with at least one antenna. Additionally, a similar selection is performed for a transmit antenna.

With reference now to the figures, FIG. 1 illustrates an architecture 100 that advantageously provides improved MIMO for CPEs, for example for a multiuser MIMO (MU-MIMO) CPE 110. CPE 110 is a wireless apparatus that provides connectivity to route data 102 between data sources 104a-104c, plus a data destination 106, and a wireless network 150. Four simultaneous receive and two simultaneous transmit is a common MIMO configuration for a CPE. Data source 104a and data source 104b are shown as both sending and receiving data, data source 104c is shown as sending data only, and data destination is shown as receiving data only. Data 102 is sent to and received from a set of servers 160a-160c, through a packet data network (PDN) 156 (e.g., the internet), on the opposite side of wireless network 150.

For example, data source 104a may be receiving streaming video from server 160a, data source 104b may be engaging in an interactive gaming session hosted by server 160b, data source 104c may be a sensor streaming data to server 160c, and data destination 106 may be receiving streaming data from server 160c. Other scenarios of moving data 102 between data sources 104a-104c, plus data destination 106, and servers 160a-160c are also within the scope of the operation of CPE 110.

CPE 110 communicates with wireless network 150 using base station 152 of wireless network, over an air interface 154. In some examples, wireless network comprises a cellular network, such as a fourth generation (4G), a fifth generation (5G), or a later generation (e.g., 6G) cellular network. In some examples, wireless network 150 comprises another type of network. In some examples, base station 152 comprises a cellular base station (e.g., 4G, 5G, or later). In some examples, base station 152 comprises a WiFi base station. In some examples, there are multiple base stations 152, some cellular and some WiFi. In some examples, CPE 110 also includes one or more wired connections to PDN 156. In some examples, CPE 110 is able to reach PDN 156 via cellular, WiFi, and wired connections.

CPE 110 comprises a signal routing portion 120, an interface layer 200, and a radio frequency (RF) routing portion 140. Interface layer 200 is shown in further detail in FIG. 2 and described below. Signal routing portion 120 comprises an application layer 122, a bonding layer 124, and a routing layer 126, and is operative to route data between a plurality of wireless interfaces 202 (as shown below in FIG. 2) and one or more of data sources 104a-104c and/or data destination 106 (which are external to CPE 110).

Application layer 122 is operative to provide a gateway for data streams 123 between CPE 110 and a data source and/or a data destination external to CPE 110. Application layer 122 collects incoming data from user terminals and converts it into packets with a particular destination (e.g., one of servers 160a-160c), but is not involved with selecting a particular routs, and allocates incoming data to destinations on the user side of CPE 110. Application layer 122 also handles retransmission requests and error correction.

Bonding layer 124 is operative to route data 125 between routing layer 126 and application layer 122. Bonding layer 124 identifies which interfaces to use for outgoing data packets 127 and accepts incoming data packets 127 from routing layer 126, and translates between data streams 123 to routes, breaking up outbound data streams 123 into individual packets and aggregating packets into data streams 123.

Routing layer 126 is operative to route data packets 127 between plurality of wireless interfaces 202 and bonding layer 124. Routing layer 126 identifies a number of available wireless interfaces 202a-202d (shown later in FIG. 2) interfaces as routes, and the priority and destinations that each can reach, and presents the routes to bonding layer 124. Routing layer 126 funnels incoming data packets 127 from wireless interfaces 202a-202d to bonding layer 124 and makes routes (channels) available to bonding layer 124 for outgoing data packets 127, without awareness of which data packet is associated with a particular one of data streams 123.

Figure 2:
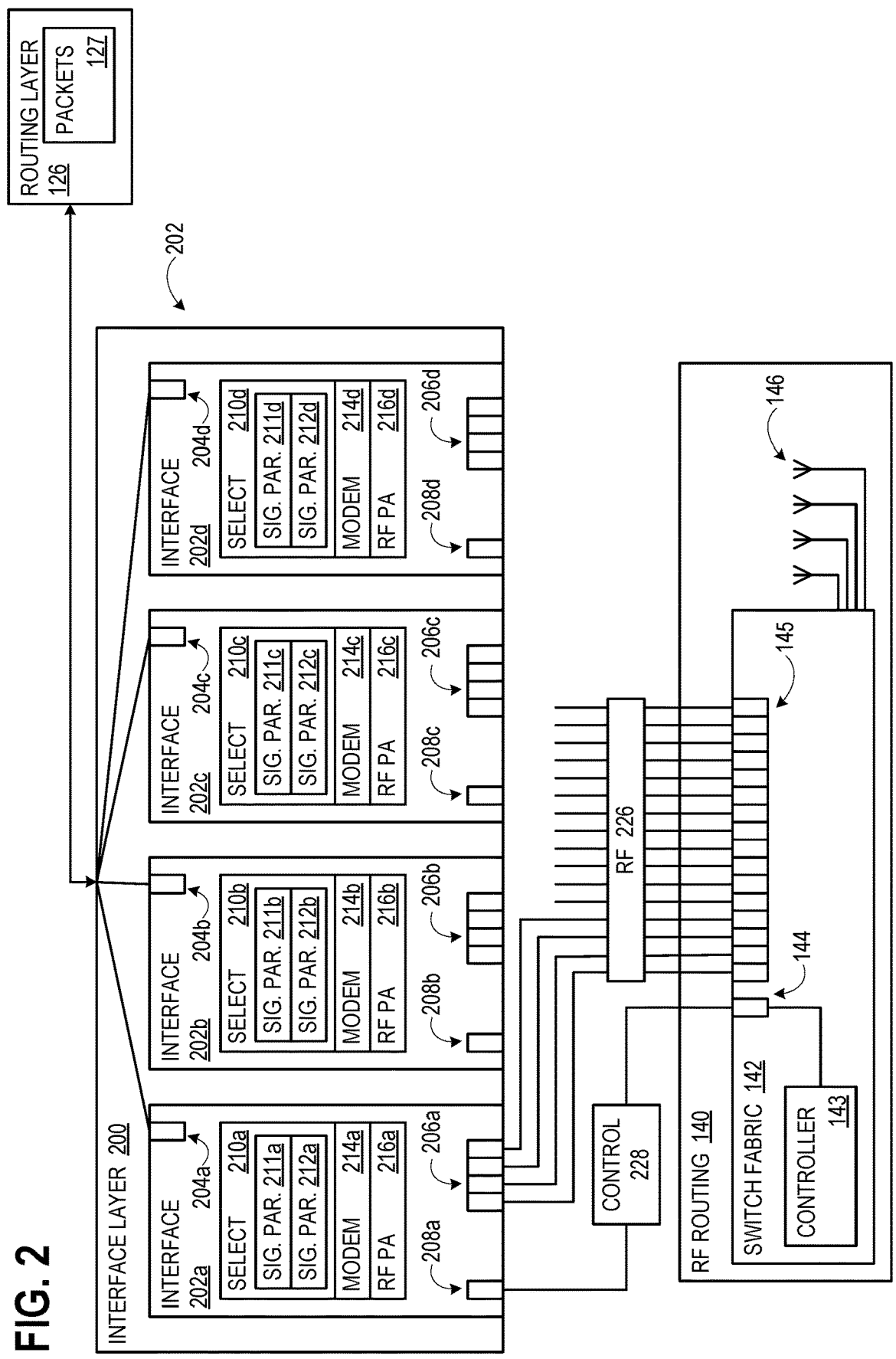
FIG. 2 illustrates further detail for the example CPE of FIG. 1.

Turning now to FIG. 2, more detail regarding plurality of wireless interfaces 202 is shown. Plurality of wireless interfaces 202 is shown as comprising wireless interface 202a, wireless interface 202b, wireless interface 202c, and wireless interface 202d, each of which may comprise a MIMO wireless interface. In some examples, at least one of wireless interfaces 202a-202d comprises a cellular modem, such as a 4G, 5G, or later generation cellular modem. In some examples, at least one of wireless interfaces 202a-202d comprises a WiFi interface, with a modem. Although four wireless interfaces are illustrated, it should be understood that other examples may use a different number of wireless interfaces.

Each of wireless interfaces 202a-202d has a data port for receiving data for transmission over air interface 154 and outputting data received over air interface 154. For example, wireless interface 202a has a data port 204a, wireless interface 202b has a data port 204b, wireless interface 202c has a data port 204c, and wireless interface 202d has a data port 204d. Each of the wireless interfaces 202a-202d also has a modem and an RF power amplifier. For example, wireless interface 202a has a modem 214a and an RF power amplifier 216a, wireless interface 202b has a modem 214b and an RF power amplifier 216b, wireless interface 202c has a modem 214c and an RF power amplifier 216c, and wireless interface 202d has a modem 214d and an RF power amplifier 216d.

The selection of which of wireless interfaces 202a-202d to use by routing layer 126 includes, in some examples, the frequency of a serving cell (versus the frequencies supported by each wireless interface), the cellular generation of a serving cell (versus the cellular generation supported by each wireless interface), which modems are available with a link over air interface 154, the number of base stations 152, and RF link quality available to each wireless interface.

Each of wireless interfaces 202a-202d has a plurality of antenna ports, such at least four antenna ports, and is operative to use at least two antenna ports simultaneously for receiving and/or use at least two antenna ports simultaneously for transmitting (e.g., MIMO for receive and/or transmit). For example, wireless interface 202a has a plurality of antenna ports 206a, wireless interface 202b has a plurality of antenna ports 206b, wireless interface 202c has a plurality of antenna ports 206c, and wireless interface 202d has a plurality of antenna ports 206d. The plurality of antenna ports for each of the wireless interfaces 202a-202d is coupled to an antenna switch fabric 142 (described below) to route RF signals 226 to/from antenna switch fabric 142.

To avoid cluttering FIG. 2, only plurality of antenna ports 206a of wireless interface 202a is shown connected to antenna switch fabric 142, although it should be understood that each of plurality of antenna ports 206b-206d (of wireless interfaces 202b-206d) is also connected to antenna switch fabric 142.

Each of the wireless interfaces 202a-202d selects one or more of its antenna ports for receive and for transmit using selection logic. For example, wireless interface 202a has selection logic 210a, wireless interface 202b has selection logic 210b, wireless interface 202c has selection logic 210c, and wireless interface 202d has selection logic 210d. The selection of antenna ports for receive and transmit may be independent. There is a pool of antennas to use in CPE 110, shown as a plurality of antennas 146. Each of wireless interfaces 202a-202d is operative to control antenna switch fabric 142 to select at least one receive antenna and at least one transmit antenna, from plurality of antennas 146, for each antenna port (of the plurality of antenna ports of the wireless interface) that is used for receiving and also for each antenna port (of the plurality of antenna ports of the wireless interface) that is used for transmitting.

A first signal parameter associated with at least one antenna is used for selecting the receive antenna(s). This parameter may be reference signal received power (RSRP), signal to interference and noise ratio (SINR), reference signal received quality (RSRQ), or some combination, and is measured locally to the wireless interface, such as by the wireless interface itself. For example, wireless interface 202a is shown with a signal parameter 211a, wireless interface 202b is shown with a signal parameter 211b, wireless interface 202c is shown with a signal parameter 211c, and wireless interface 202d is shown with a signal parameter 211d. There may be a first signal parameter measured for each of multiple antennas, in some examples, to select an optimal antenna or set off best antennas for receiving. For example, the antenna(s) having the best RF performance, as indicated by the highest first signal parameter value.

Each of the wireless interfaces 202a-202d controls antenna switch fabric 142 to effect the selection of the receive antenna. To accomplish this, each of wireless interfaces 202a-202d has a control port and sends a control signal 228 to antenna switch fabric 142. For example, wireless interface 202a has a control port 208a, wireless interface 202b has a control port 208b, wireless interface 202c has a control port 208c, and wireless interface 202d has a control port 208d. To avoid cluttering FIG. 2, only control port 208a of wireless interface 202a is shown connected to antenna switch fabric 142, although it should be understood that each of control ports 208b-208d (of wireless interfaces 202b-206d) is also connected to antenna switch fabric 142.

A second signal parameter associated with at least one antenna is used for selecting the transmit antenna(s). This parameter may also be RSRP, SINR, RSRQ, or some combination. For example, wireless interface 202a is shown with a signal parameter 212a, wireless interface 202b is shown with a signal parameter 212b, wireless interface 202c is shown with a signal parameter 212c, and wireless interface 202d is shown with a signal parameter 212d.

For time division duplexing (TDD), in which a common frequency (e.g., the same frequency) is used for both transmitting and receiving, the transmit channel conditions may be inferred to be the same as the receive channel conditions. In such a scenario, the first signal parameter is a common signal parameter (signal parameters 212a-212d are duplicates of or just the same one as a respective one of signal parameters 211a-211d) that may be used for selection of both receive and transmit antennas.

However, for frequency division duplexing (FDD), in which different frequencies are used for transmitting and receiving, the transmit channel conditions may be different than the receive channel conditions. In such a scenario, the selection of the transmit antenna(s) is independent of the selection of the receive antenna(s). The second signal parameter may then be measured at a distant end 158 of air interface 154 (see FIG. 1), for example by base station 152. Base station 152 is shown in FIG. 1 as having measured a signal parameter 212 (representing any of signal parameters 212a-202d for any antenna of plurality of antennas 146) and provides signal parameter 212 as feedback to CPE 110. In some examples, a single CPE 110 may use both TDD and FDD, such as by having at least one wireless interface that uses TDD while at least one other wireless interface uses FDD.

RF routing portion 140 comprises antenna switch fabric 142 and plurality of antennas 146. In some examples, plurality of antennas 146 comprises at least 16 antennas, which may be anything from omnidirectional (as best as can be achieved) to high gain antennas. RF routing portion 140 routes RF signals 226 between interface layer 200 (specifically plurality of antenna ports 206a-206d) and the corresponding selected antennas of plurality of antennas 146. Antenna switch fabric 142 is coupled to each of plurality of antenna ports 206a-206d, with its own set of antenna port inputs 145, and is further coupled to plurality of antennas 146.

Antenna switch fabric 142 is operative to, based on at least the control by each of wireless interfaces 202a-202d, route RF signals 226 between antenna ports 206a-206d and the corresponding selected antennas of plurality of antennas 146. Antenna switch fabric 142 has at least one control port 144 coupled to control port 208a of wireless interface 202a, and is also coupled to control ports 208b-208d of wireless interfaces 202b-202d. In some examples, antenna switch fabric 142 has multiple control ports, although in some examples, the control signals from wireless interfaces 202a-202b are multiplexed and all arrive through control port 144. Antenna switch fabric 142 further comprises a controller 143 to manage the selections of the antennas.

Figure 3:
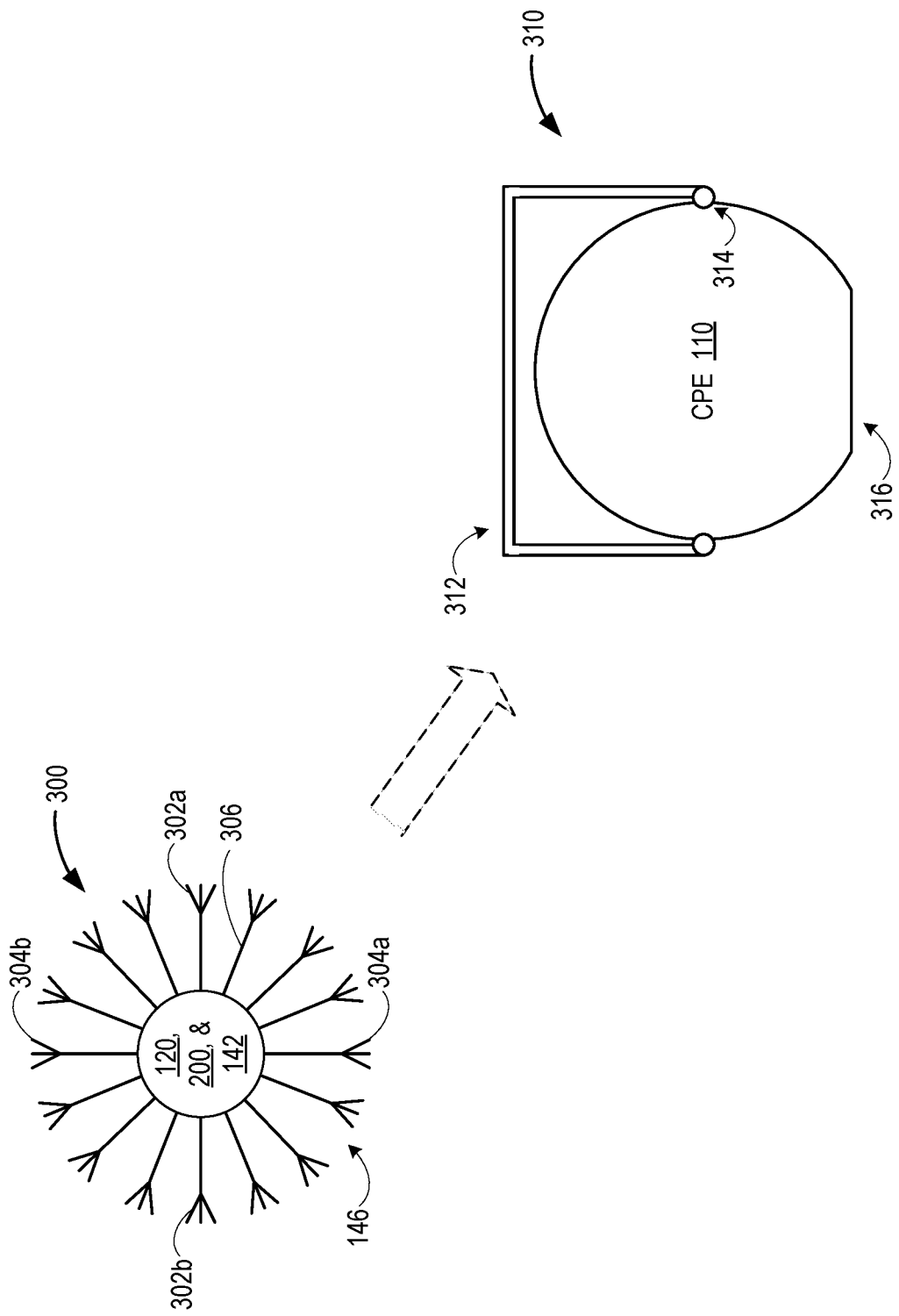
FIG. 3 illustrates physical layout options for the example CPE of FIG. 1.

FIG. 3 illustrates example physical layout options for CPE 110. In some examples, plurality of antennas 146 is disposed in a spherical arrangement 300, with the antennas themselves arranged similarly to the polygons of a soccer ball. FIG. 3 shows 16 antennas, which is the number used by some examples, although some examples may use a different number of antennas. An example selected receive antenna 302a is indicated, along with another selected receive antenna 302b for MIMO operation on receive. Similarly, an example selected transmit antenna 304a is indicated, along with another selected transmit antenna 304b for MIMO operation on transmit.

Spherical arrangement 300 may be configured to maximize antenna isolation. The receive and transmit antenna pairings (e.g., receive antennas 302a and 302b and transmit antennas 304a and 304b) being on opposing sides of spherical arrangement 300 may be a common selection in some operational scenarios, due to MIMO channel separation. Antenna cabling 306 couples each antenna of plurality of antennas 146 to antenna switch fabric 142.

The physical structure of CPE 110 may further include isolation components, such as RF absorbing material and shielding, to further improve antenna isolation. Additionally, various differing antenna polarizations may be used among the antennas of plurality of antennas 146 (e.g., horizontal, vertical, and other slanted linear or even elliptical polarizations), in order to provide improved coupling to the wide range of potential channel conditions. The physical structure of CPE 110 may further include the ability to tilt the entire assembly relative to a mounting surface, in order to alter the as-installed polarization tilt of the antennas, if a known dominant polarization is expected, due to the operating environment.

Figure 5:
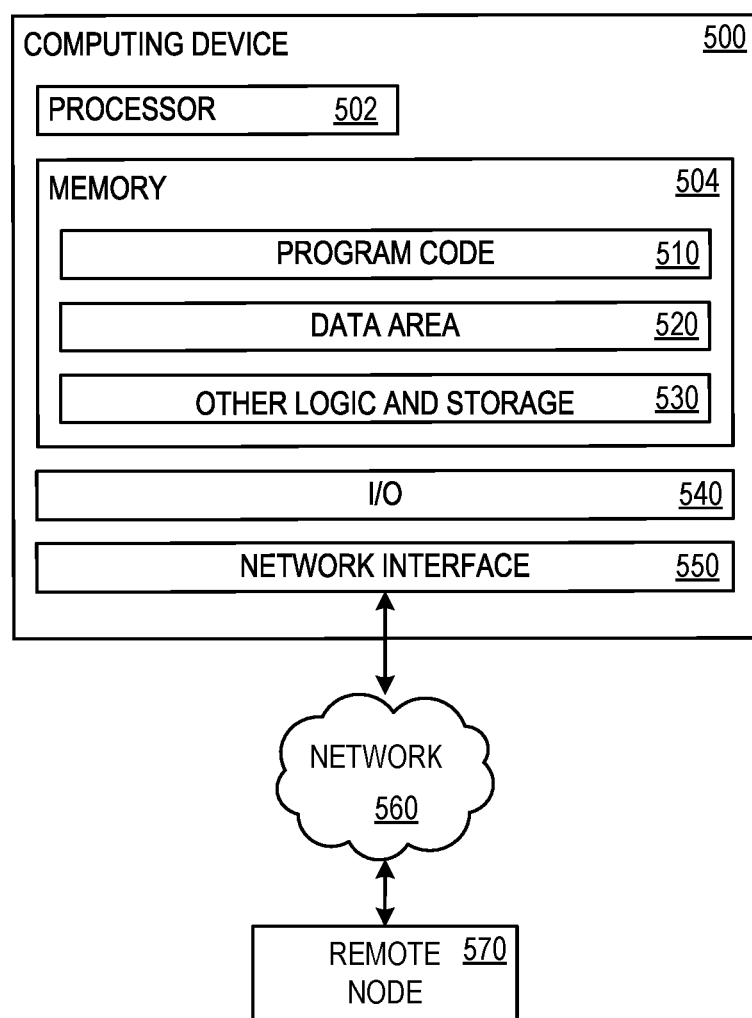
FIG. 5 illustrates a block diagram of a computing device suitable for implementing various aspects of the disclosure.

Signal routing portion 120 and interface layer 200 may be implemented using a computing device 500 of FIG. 5, located within the arrangement of plurality of antennas 146, such as at the center of spherical arrangement 300. That is, application layer 122, bonding layer 124, and routing layer 126 are implemented using a computing device located within the arrangement of plurality of antennas 146.

Here, the term spherical includes minor deviations from a perfectly spherical shape to include perturbations for mounting, preventing rolling, and allowances for external cabling. For example, in an example physical form factor 310, a mounting bracket 312 may enable attachment to a surface, such as a wall, ceiling, or tabletop surface, and introduces at least one perturbation 314 into a spherical exterior of CPE 110. Additionally, a flat section 316, which enables CPE 110 to be set down without rolling, causes a deviation from a pure spherical shape, but yet may still be considered to provide a spherical arrangement for plurality of antennas 146.

Figure 4:
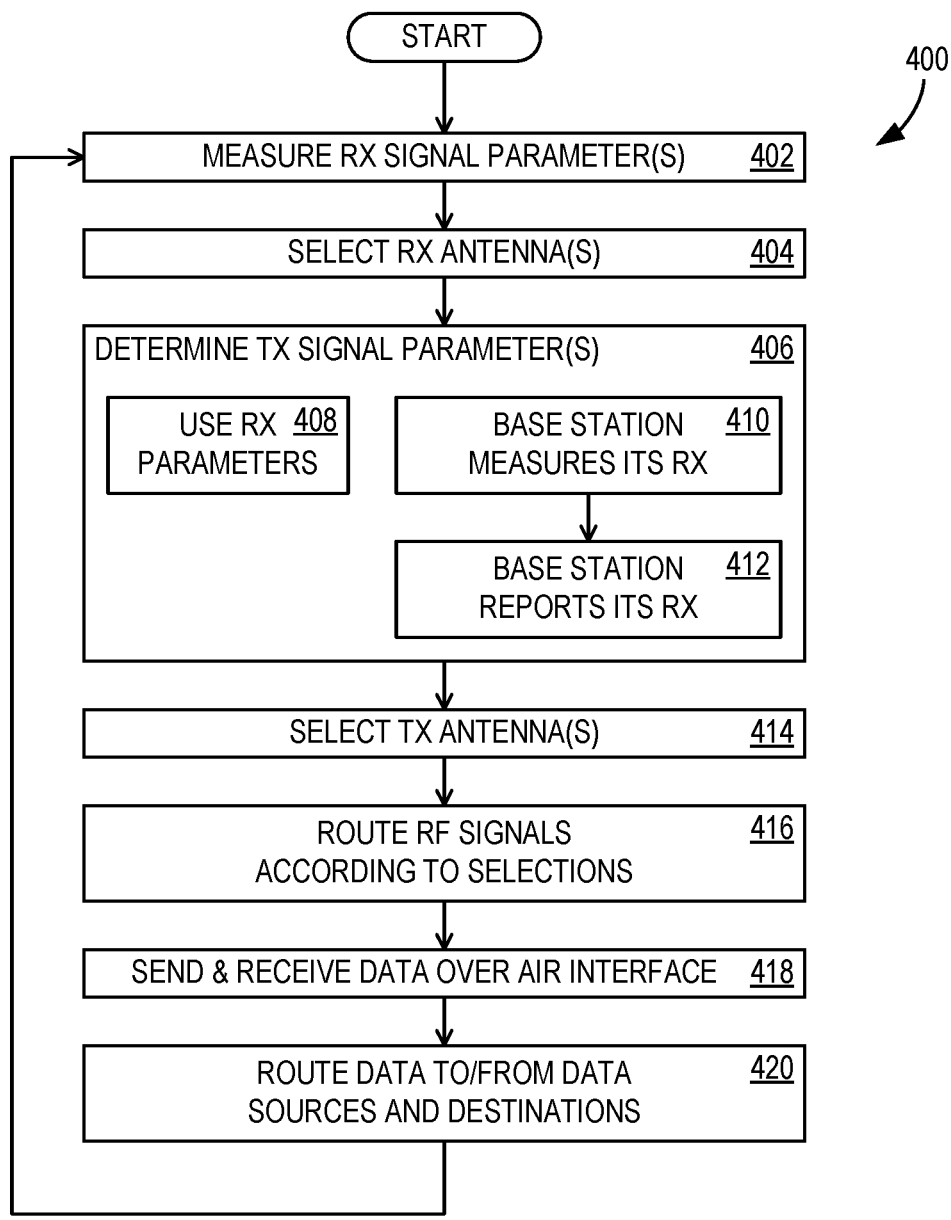
FIG. 4 illustrates a flowchart of exemplary operations associated with the architecture of FIG. 1.

FIG. 4 illustrates a flowchart 400 of exemplary operations associated with examples of architecture 100. In some examples, at least a portion of flowchart 400 may be performed using one or more computing devices 500 of FIG. 5. Flowchart 400 commences with operation 402, which includes each of the plurality of wireless interfaces 202a-202d measuring the first signal parameter associated with at least one antenna for each antenna port that is used for receiving. Operation 404 includes each of the plurality of wireless interfaces 202a-202d controlling antenna switch fabric 142 to select at least one receive antenna from among plurality of antennas 146, based on at least the first signal parameter.

In operation 406, each of the plurality of wireless interfaces 202a-202d determines the second signal parameter associated with at least one antenna, for each antenna port that is used for transmitting. Operation 406 may be carried out using operation 408 and or operations 410-412. In operation 408, the second signal parameter and the first signal parameter are both a common signal parameter, such as when transmit and receive frequencies are the same, and so the measurement of the first parameter is used. When transmit and receive frequencies are different, in operation 410, base station 152 measures the second signal parameter and transmits it to CPE 110.

The wireless interface receives the second signal parameter from distant end 158 of air interface 154 in operation 412. Operation 414 includes each of the plurality of wireless interfaces 202a-202d controlling antenna switch fabric 142 to select at least one transmit antenna from among plurality of antennas 146, based on at least the second signal parameter.

In operation 416, antenna switch fabric 142 routes RF signals 226 between plurality of antenna ports 206a-206s and the corresponding selected antennas of plurality of antennas 146. Data 102 is sent and received over air interface 154 in operation 418, and is routed to/from data sources 104a-104c and data destination 106, in operation 420.

FIG. 5 illustrates a block diagram of computing device 500 that may be used as any component described herein that may require computational or storage capacity. Computing device 500 has at least a processor 502 and a memory 504 that holds program code 510, data area 520, and other logic and storage 530. Memory 504 is any device allowing information, such as computer executable instructions and/or other data, to be stored and retrieved. For example, memory 504 may include one or more random access memory (RAM) modules, flash memory modules, hard disks, solid-state disks, persistent memory devices, and/or optical disks. Program code 510 comprises computer executable instructions and computer executable components including instructions used to perform operations described herein. Data area 520 holds data used to perform operations described herein. Memory 504 also includes other logic and storage 530 that performs or facilitates other functions disclosed herein or otherwise required of computing device 500. An input/output (I/O) component 540 facilitates receiving input from users and other devices and generating displays for users and outputs for other devices. A network interface 550 permits communication over a network 560 with a remote node 570, which may represent another implementation of computing device 500. For example, a remote node 570 may represent another of the above-noted nodes within architecture 100.

ADDITIONAL EXAMPLES

An example system comprises: a plurality of MIMO wireless interfaces, each wireless interface comprising: a data port for receiving data for transmission over an air interface and outputting data received over the air interface, and a plurality of antenna ports; an antenna switch fabric coupled to each of the plurality of antenna ports of each of the plurality of wireless interfaces, and further coupled to a plurality of antennas; wherein each wireless interface is operative to: for each antenna port of the plurality of antenna ports of the wireless interface that is used for receiving, control the antenna switch fabric to select, based on at least a first signal parameter associated with at least one antenna, a receive antenna, and for each antenna port of the plurality of antenna ports of the wireless interface that is used for transmitting, control the antenna switch fabric to select, based on at least a second signal parameter associated with at least one antenna, a transmit antenna; and wherein the antenna switch fabric is operative to, based on at least the control by each wireless interface, route RF signals between the antenna ports and the corresponding selected antennas of the plurality of antennas.

Another example system comprises: a signal routing portion; a signal routing portion; a plurality of MIMO wireless interfaces, each wireless interface comprising: a data port for receiving data for transmission over an air interface and outputting data received over the air interface, and a plurality of antenna ports; and an RF routing portion comprising: an antenna switch fabric, and a plurality of antennas; wherein the signal routing portion is operative to route data between the plurality of wireless interfaces and a data source and/or a data destination external to the CPE; wherein each wireless interface is operative to: for each antenna port of the plurality of antenna ports of the wireless interface that is used for receiving, control the antenna switch fabric to select, based on at least a first signal parameter associated with at least one antenna, a receive antenna, and for each antenna port of the plurality of antenna ports of the wireless interface that is used for transmitting, control the antenna switch fabric to select, based on at least a second signal parameter associated with at least one antenna, a transmit antenna, wherein the selection of the transmit antenna is independent of the selection of the receive antenna; and wherein the antenna switch fabric is coupled to each of the plurality of antenna ports of each of the plurality of wireless interfaces, and further coupled to a plurality of antennas and is operative to, based on at least the control by each wireless interface, route RF signals between the antenna ports and the corresponding selected antennas of the plurality of antennas.

An example method comprises: by each of a plurality of MIMO wireless interfaces: measuring, for each antenna port of a plurality of antenna ports of the wireless interface that is used for receiving, a first signal parameter associated with at least one antenna; based on at least the first signal parameter, controlling an antenna switch fabric coupled to the plurality of antenna ports to select a receive antenna from among a plurality of antennas; determining, by each of the plurality of wireless interfaces, for each antenna port of the plurality of antenna ports of the wireless interface that is used for transmitting, a second signal parameter associated with at least one antenna: based on at least the second signal parameter, controlling the antenna switch fabric to select a transmit antenna from among the plurality of antennas; and routing, by the antenna switch fabric, RF signals between the antenna ports and the corresponding selected antennas of the plurality of antennas.

Alternatively, or in addition to the other examples described herein, examples include any combination of the following:

- for each the wireless interface using a common frequency for transmitting and receiving, the first signal parameter and the second signal parameter comprise a common signal parameter measured locally to the wireless interface;
- for each the wireless interface using different frequencies for transmitting and receiving, the first signal parameter is measured locally to the wireless interface and the second signal parameter is measured at a distant end of the air interface;
- the first signal parameter is measured by the wireless interface;
- the selection of the transmit antenna is independent of the selection of the receive antenna;
- the plurality of antennas is disposed in a spherical arrangement;
- the plurality of antennas comprises at least 16 antennas;
- the system comprises a wireless CPE;
- the CPE comprises a signal routing portion and an RF routing portion;
- the RF routing portion comprises the antenna switch fabric and the plurality of antennas;
- the signal routing portion comprises an application layer, a bonding layer, and a routing layer;
- the routing layer is operative to route data packets between the plurality of wireless interfaces and the bonding layer;
- the bonding layer is operative to route data between the routing layer and the application layer;
- the application layer is operative to provide a gateway for data streams between the CPE and data sources external to the CPE;
- the application layer is operative to provide a gateway for data streams between the CPE and data destinations external to the CPE;
- the application layer, the bonding layer, and the routing layer are implemented using a computing device located within an arrangement of the plurality of antennas;
- each wireless interface is operative to use at least two antenna ports simultaneously for receiving;
- each wireless interface is operative to use at least two antenna ports simultaneously for transmitting;
- each wireless interface comprises at least four antenna ports;
- each wireless interface comprises a modem and an RF power amplifier;
- at least one wireless interface comprises a cellular modem;
- the cellular modem comprises a 5G cellular modem;
- the cellular modem comprises a 5G or later cellular modem;
- at least one wireless interface comprises a WiFi modem;
- the first and second signal parameter each comprises RSRP;
- the first and second signal parameter each comprises RSRQ;
- each wireless interface further comprises a control port;
- the antenna switch fabric comprises at least one control port coupled to the control port of at least one of the wireless interfaces;
- the antenna switch fabric further comprises a controller to manage the selections of the antennas;
- the plurality of antennas comprises at least 16 antennas disposed in a spherical arrangement;
- the signal routing portion is implemented using a computing device located within the spherical arrangement;
- receiving the second signal parameter from a distant end of an air interface;
- determining the second signal parameter comprises measuring the first signal parameter; and
- the first signal parameter and the second signal parameter comprise a common signal parameter.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An apparatus comprising:
   a plurality of wireless interfaces, each wireless interface comprising a multiple-input multiple-output (MIMO) wireless interface comprising:
     a data port for receiving data for transmission over an air interface and outputting the data received over the air interface, and
     a plurality of antenna ports;
   an antenna switch fabric coupled to each of the plurality of antenna ports of each of the plurality of wireless interfaces, and further coupled to a plurality of antennas;
   wherein each wireless interface is operative to:
     for each antenna port of the plurality of antenna ports of a wireless interface that is used for receiving, control the antenna switch fabric to select, based on at least a first signal parameter associated with at least one antenna, a receive antenna, and
     for each antenna port of the plurality of antenna ports of a wireless interface that is used for transmitting, control the antenna switch fabric to select, based on at least a second signal parameter associated with at least one antenna, a transmit antenna; and
   wherein the antenna switch fabric is operative to, based on at least the control by each wireless interface, route radio frequency (RF) signals between the antenna ports and corresponding selected antennas of the plurality of antennas.

2. The apparatus of claim 1, wherein
   for a first wireless interface using a common frequency for transmitting and receiving, the first signal parameter and the second signal parameter comprise a common signal parameter measured locally to the first wireless interface; and/or
   for a second wireless interface using different frequencies for transmitting and receiving, the first signal parameter is measured locally to the second wireless interface and the second signal parameter is measured at a distant end of the air interface.

3. The apparatus of claim 1, wherein the first signal parameter is measured by the wireless interface that is used for receiving.

4. The apparatus of claim 1, wherein the selection of the transmit antenna is independent of the selection of the receive antenna.

5. The apparatus of claim 1, wherein the plurality of antennas is disposed in a spherical arrangement.

6. The apparatus of claim 1, wherein the plurality of antennas comprises at least 16 antennas.

7. The apparatus of claim 1,
   wherein the apparatus comprises a wireless customer premises equipment (CPE);
   wherein the CPE comprises a signal routing portion and an RF routing portion;
   wherein the RF routing portion comprises the antenna switch fabric and the plurality of antennas; and
   wherein the signal routing portion comprises an application layer, a bonding layer, and a routing layer.

8. The apparatus of claim 7,
   wherein the routing layer is operative to route data packets between the plurality of wireless interfaces and the bonding layer;
   wherein the bonding layer is operative to route data between the routing layer and the application layer; and
   wherein the application layer is operative to provide a gateway for data streams between the CPE and a data source and/or a data destination external to the CPE.

9. The apparatus of claim 7, wherein the application layer, the bonding layer, and the routing layer are implemented using a computing device located within an arrangement of the plurality of antennas.

10. The apparatus of claim 1, wherein each wireless interface is operative to use at least two antenna ports simultaneously for receiving and/or use the at least two antenna ports simultaneously for transmitting.

11. The apparatus of claim 1, wherein each wireless interface comprises at least four antenna ports.

12. The apparatus of claim 1, wherein each wireless interface comprises a modem and an RF power amplifier.

13. The apparatus of claim 12, wherein at least one wireless interface comprises a cellular modem.

14. The apparatus of claim 12, wherein at least one wireless interface comprises a WiFi modem.

15. A method of wireless communication comprising:
   by each of a plurality of wireless interfaces, wherein each of the plurality of wireless interfaces comprises a multiple-input multiple-output (MIMO) wireless interface:
     measuring, for each antenna port of a plurality of antenna ports of a wireless interface that is used for receiving, a first signal parameter associated with at least one antenna;
     based on at least the first signal parameter, controlling an antenna switch fabric coupled to the plurality of antenna ports to select a receive antenna from among a plurality of antennas;
     determining, by each of the plurality of wireless interfaces, for each antenna port of the plurality of antenna ports of a wireless interface that is used for transmitting, a second signal parameter associated with at least one antenna;
     based on at least the second signal parameter, controlling the antenna switch fabric to select a transmit antenna from among the plurality of antennas; and
   routing, by the antenna switch fabric, radio frequency (RF) signals between the antenna ports and the corresponding selected antennas of the plurality of antennas.

16. The method of claim 15, wherein determining the second signal parameter comprises:
   measuring the first signal parameter, wherein the first signal parameter and the second signal parameter comprise a common signal parameter; or
   receiving the second signal parameter from a distant end of an air interface.

17. A wireless customer premises equipment (CPE) comprising:
   a signal routing portion;
   a plurality of wireless interfaces, each wireless interface comprising a multiple-input multiple-output (MIMO) wireless interface that comprises:

a data port for receiving data for transmission over an air interface and outputting the data received over the air interface, and
a plurality of antenna ports; and
an RF routing portion comprising:
an antenna switch fabric, and
a plurality of antennas;
wherein the signal routing portion is operative to route the data between the plurality of wireless interfaces and a data source and/or a data destination external to the CPE;
wherein each wireless interface is operative to:
for each antenna port of the plurality of antenna ports of the wireless interface that is used for receiving, control the antenna switch fabric to select, based on at least a first signal parameter associated with at least one antenna, a receive antenna, and
for each antenna port of the plurality of antenna ports of the wireless interface that is used for transmitting, control the antenna switch fabric to select, based on at least a second signal parameter associated with at least one antenna, a transmit antenna, wherein the selection of the transmit antenna is independent of the selection of the receive antenna; and
wherein the antenna switch fabric is coupled to each of the plurality of antenna ports of each of the plurality of wireless interfaces, and further coupled to a plurality of antennas and is operative to, based on at least the control by each wireless interface, route radio frequency (RF) signals between the antenna ports and the corresponding selected antennas of the plurality of antennas.

18. The CPE of claim 17, wherein
for each the wireless interface using a common frequency for transmitting and receiving, the first signal parameter and the second signal parameter comprise a common signal parameter measured by the wireless interface; and/or
for each the wireless interface using different frequencies for transmitting and receiving, the first signal parameter is measured by the wireless interface and the second signal parameter is measured at a distant end of the air interface.

19. The CPE of claim 17,
wherein the plurality of antennas comprises at least 16 antennas disposed in a spherical arrangement; and
wherein the signal routing portion is implemented using a computing device located within the spherical arrangement.

20. The CPE of claim 17,
wherein each wireless interface comprises at least four antenna ports;
wherein each wireless interface is operative to use at least two antenna ports simultaneously for receiving and/or use the at least two antenna ports simultaneously for transmitting;
wherein each wireless interface comprises a modem and an RF power amplifier;
wherein at least one wireless interface comprises a fifth generation (5G) cellular modem; and
wherein at least one wireless interface comprises a WiFi modem.

* * * * *